Figure 8:
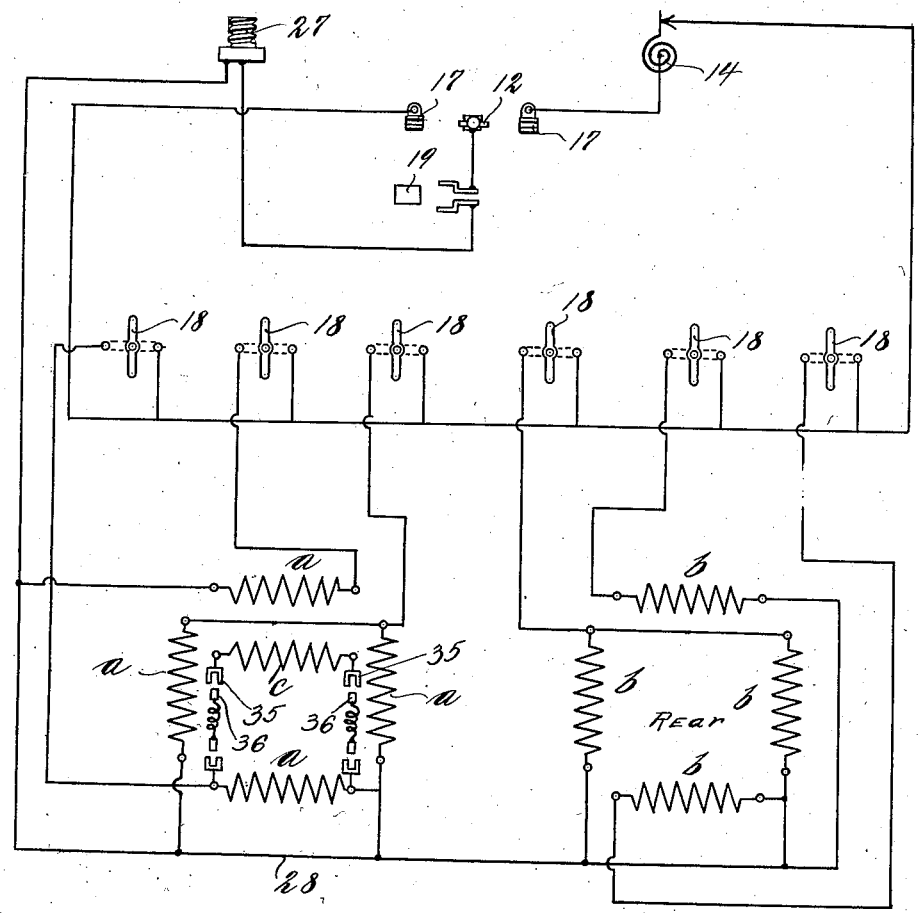

A. CARPENTER.
ELECTRIC HEATER.
APPLICATION FILED NOV. 12, 1910.
996,454.
Patented June 27, 1911.
3 SHEETS—SHEET 1.
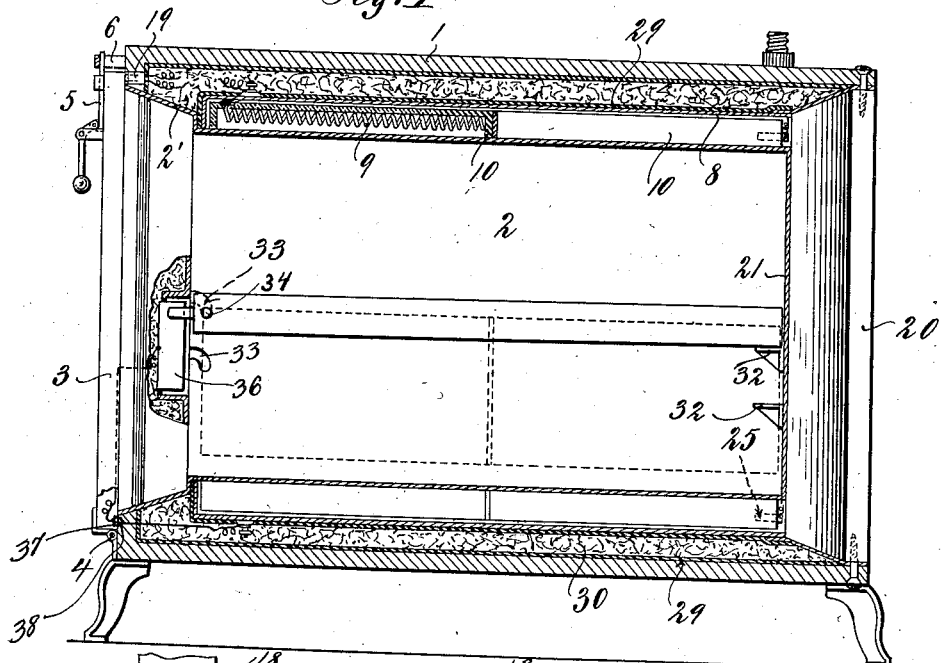
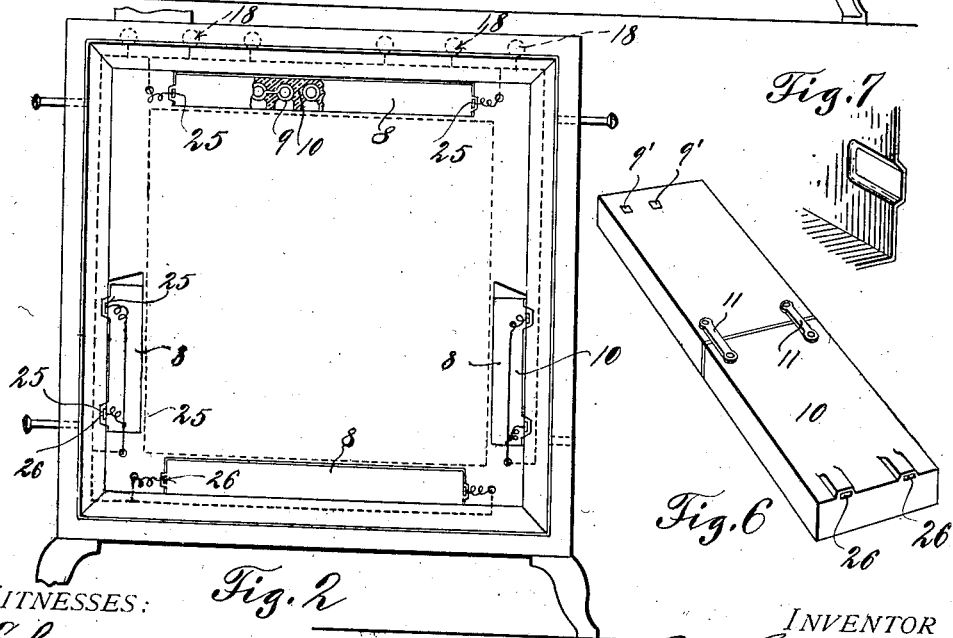
WITNESSES:
INVENTOR
Attorneys A. CARPENTER.
ELECTRIC HEATER.
APPLICATION FILED NOV. 12, 1910.
996,454.
Patented June 27, 1911.
3 SHEETS—SHEET 2.
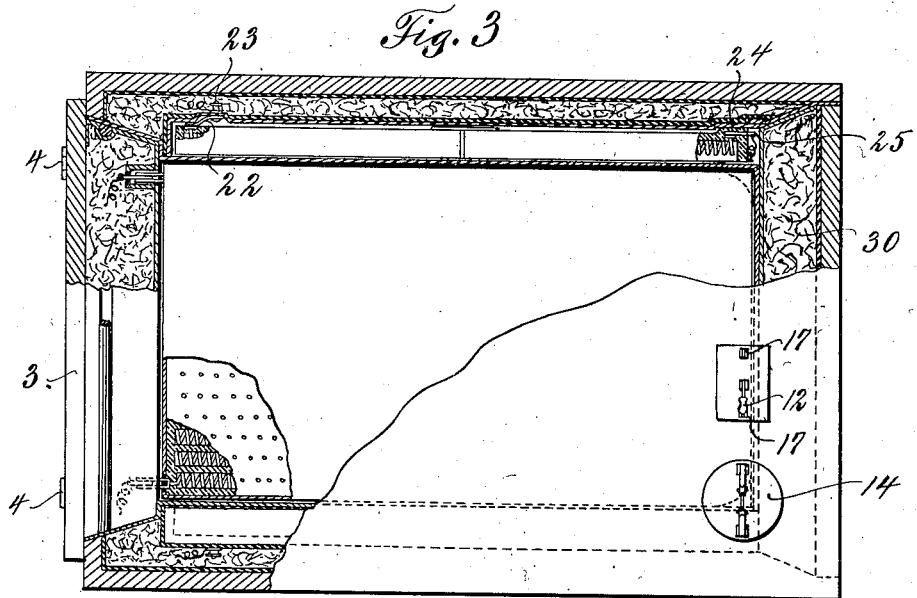
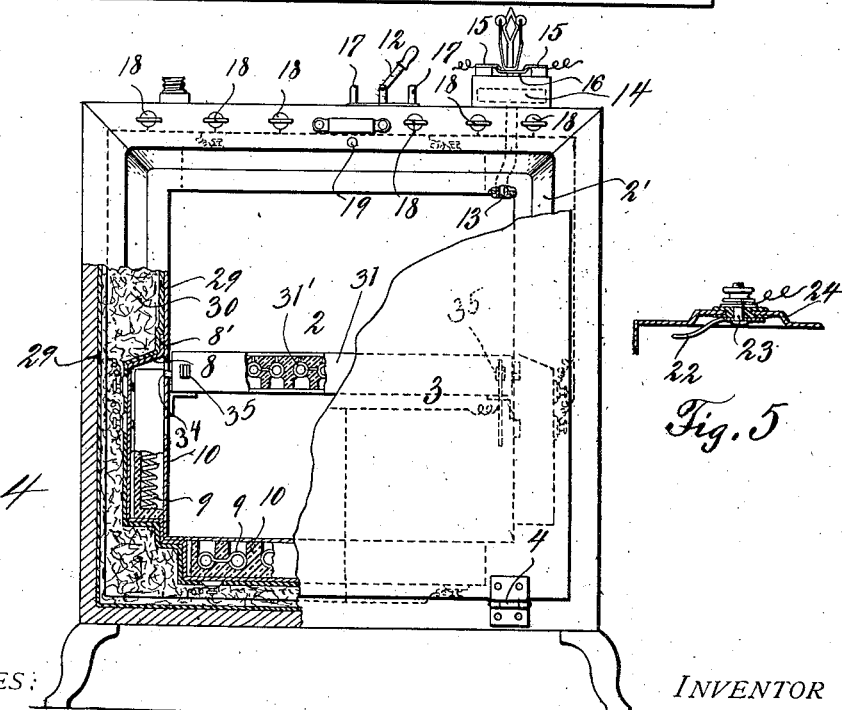
WITNESSES:
INVENTOR
Adam Carpenter
BY
Attorneys

A. CARPENTER.
ELECTRIC HEATER.
APPLICATION FILED NOV. 12, 1910.

996,454.

Patented June 27, 1911.

3 SHEETS—SHEET 3.

WITNESSES:
E. Larson
J. E. Dodge

INVENTOR
Adam Carpenter
BY Beeler & Cobb
J. W. Cobb, Attorney

UNITED STATES PATENT OFFICE.

ADAM CARPENTER, OF TACOMA, WASHINGTON.

ELECTRIC HEATER.

996,454.  Specification of Letters Patent.  Patented June 27, 1911.

Application filed November 12, 1910. Serial No. 592,103.

*To all whom it may concern:*

Be it known that I, ADAM CARPENTER, a citizen of the United States, residing at Tacoma, in the county of Pierce and State of Washington, have invented certain new and useful Improvements in Electric Heaters, of which the following is a specification.

The present invention involves certain improvements in electrical heaters of the type embodying compartments in which articles of food may be received and cooked.

The invention aims to combine a heater and fireless cooker construction, so to speak, in that the heater is comprised of a chamber surrounded by a substance constituting a non-conductor of heat or cold, so that articles after being heated in the chamber may be retained therein after the heat is cut off and subjected to subsequent cooking by reason of the retention of the heat in the device.

Electric heaters as at present constructed have been disadvantageously employed because of the lack of suitable controlling means for preventing the heater from being burned out, and also for regulating the temperature in the heating chamber in such a manner that it will be constant and reliable. In carrying out the invention hereinafter set forth, automatic means are utilized to start and stop the operation of the heating device or devices; means are also utilized whereby any one or more of said heating devices at different portions of the heating chamber, may be started or thrown out of operation, and other means associated electrically with the heating devices whereby, whenever the heating chamber is opened, the operation of the heating device will be discontinued temporarily until said chamber is closed.

For a full understanding of the present invention, reference is to be had to the following description and to the accompanying drawings, in which—

Figure 1 is a vertical longitudinal sectional view of a heater embodying the essential features of the invention, the detachable rear end of the heater being shown in side elevation; Fig. 2 is a view looking into the rear end of the heater after the end piece has been displaced, one of the heating units being shown in section; Fig. 3 is a top plan view and partial section; Fig. 4 is a front elevation, partly broken away, and shown in section; Fig. 5 is a detail sectional view of the electrical contact carried by the wall of an auxiliary compartment, in one of which, each heating unit is received; Fig. 6 is a perspective view of the insulating body of one of the heating units; Fig. 7 is a detail perspective view of the socket formed in the wall of each heating unit compartment, to receive the secured end of an adjacent electrical contact, shown better in Fig. 5; Fig. 8 is a diagrammatic view of the circuit connections, including the various parts of the heater and controlling devices.

Throughout the following detail description and on the several figures of the drawings, similar parts are referred to by like reference characters.

Describing the general construction of the invention, it is contemplated to provide a heater of the electrical type composed of an outer casing 1 of wood or any similar material, and an inner heating chamber 2 preferably consisting of a metallic structure, the upper, lower and side walls of which are in spaced relation to the corresponding walls of the casing 1. The front end of the heating chamber 2 is outwardly flared as shown at 2' and joined to the front portion of the casing at which point is located a suitable door 3, hinged or otherwise mounted, as at 4, and having a catch 5 at its upper portion coacting with a keeper 6 on the casing 1. In the space between the walls of the chamber 2 and the walls of the casing 1 are provided the upper and lower, and side boxes 8, which form compartments for heating units 9. The heating units are of the ordinary kind, consisting preferably of resistance coils mounted upon insulating bodies 10, the latter being of porcelain, or any similar substance susceptible of use for insulating. The boxes 8 are provided with flanges 8' at their inner edge portions, which latter are seated against and secured to the adjacent walls of the heating chamber 2 by means of rivets or other similar fastenings.

The several heating units 9, with their supporting insulating bodies 10, are preferably of substantially the same length as the heating chamber 2, and supply heat directly to the walls of said chamber. Preferably, however, the heating units 9 are made in sections, as shown clearly in Figs. 1 and 6, the insulating body 10 being made in sections to correspond with the sections of the heating unit, and suitable ties or fastening members 11 being arranged to connect the sections to the part 10, so that the latter, with the heating coils mounted therein, may be removed bodily from the box or compartment in which it is normally disposed, and for purposes of repair or the like. The sections of the heating units 9 are shown clearly in Figs. 1 and 3, as separated at the adjacent ends by the insulation 10.

The purpose of the above arrangement of the sections of the heating units is to cause certain of the sections of the heating units to operate independently of the other sections. Above the door 3, therefore, are provided a plurality of electrical buttons, each of which is connected with a certain section or sections of the heating units so that by turning the first button, for instance, and assuming that the switch 12 has been operated to close the main line circuit for the heater, the front section of the bottom heating unit 9 will be turned on. The second button will preferably control the front section of the top heating unit. The third button will control the front sections of the two side heating units, and the remaining three buttons will be connected in a similar manner with the corresponding sections of the heating units at the rear portion of the heater. The above control enables the heat to be most economically utilized, and it is contemplated that steam generated by cooking of articles in the heating chamber 2 may be conducted upwardly through a suitable passage 13, shown in dotted lines in Fig. 4, to a thermostatic regulator 14, controlling the connection of stationary contacts 15 and a movable contact 16 of the regulator 14. The regulator 14 is adapted to be placed in circuit with the main line of the electric circuit of the heater by moving the switch 12 into one of its two opposite positions, wherein it will coöperate with the switch contacts 17. Under such conditions, the operation of the various heating units, which may be turned on by the buttons designated 18, will be automatically discontinued when the heat in the chamber 2 reaches a certain degree, and when the temperature reduces below said point, the automatic regulator 14, which previously broke the circuit, will be operated to again connect the contacts 15 and 16, starting operation of the heating units. The main line circuit of the heater also includes a circuit closer 19 carried by the upper portion of the front wall of the heater and so arranged that as the door of the heater is closed, said device 19 will close the main line circuit so that any heating units which are turned on will operate, or will be ready to operate when turned on. When the switch 12 is in one of its two opposite positions, the automatic regulator 14 will be in the main line circuit of the heater, whereas, when the switch is in the other of said positions, said regulator will be cut out.

The above arrangement is desirable because under certain conditions, a boiling temperature is only necessary in the heating chamber 2 while for baking articles of food, a much higher temperature would be necessary. The automatic regulator 14, being set to discontinue the operation of the heating units when the temperature in the chamber 2 is at the boiling point, or such as to generate steam of the articles of food, it would not be suitable to retain the regulator as a controlling means when a higher temperature in the chamber 2 is desired. The provision of the circuit closer 19 is particularly advantageous because, under all conditions of service of the heater, as soon as the door 3 is open, the operation of the heating units is discontinued, economy in the use of the heater is subserved.

The several heating units 9 are removable with their insulation bodies 10, by reason of the provision of a detachable rear end 20 for the casing 1 of the heater. The end 20 has an extension 21 adapted to extend into the casing 1, into contact with the rear wall of the chamber 2 and under such conditions, the extension 21 overlaps the rear open ends of the boxes 8 providing compartments for the heating units 9.

At its front end, each heating unit carries the contacts 9' projecting through the insulation 10 and adapted to engage with spring contacts 22 secured by binding posts 23 in sockets 24 pressed outwardly from the outer walls of the boxes 8. As a heating unit is slidably moved forwardly into operative position, its contact 9' engages the spring contact 22 and the circuit is closed through said heating unit by inserting plugs 25 forming terminals of certain wires into the sockets 26 at the outer end of the insulating body of the heating unit. Displacement of the plugs 25 is prevented, when the heater has been set up, by the extension 21 closing the rear ends of the compartments provided by the boxes 8.

Referring to Fig. 8 of the drawings, 27 denotes a suitable plug from which current may be drawn from a main line, and 28 denotes a common return wire of the circuit of the heater. The front sections of the heating units are shown at $a$ and the rear sections of said units are shown at $b$. The buttons 18 control the passage of the current to one or more of the front sections of the heating units, and also to one or more of the rear sections of the heating units. The switch 12, the circuit closer 19 and the thermostatic regulator 14 are shown operably connected in the circuit.

It is to be understood that the space between the walls of the casing 1 and the walls of the chamber 2 is to receive a suitable filler such as is ordinarily employed for general use in fireless cookers, and being a non-conductor of heat or cold. The metallic walls of the chamber 2 and similar outer walls of the boxes 8 will preferably be covered by an asbestos lining 29, and the inner walls of the casing 1 will be similarly lined for preventing likelihood of ignition of the non-conducting filler 30 and the material from which the casing 1 is made.

It is contemplated to utilize in the heating chamber 2 a shelf 31, which may consist of a hollow metallic body, and incloses a heating unit 31' of practically the same construction as the units 9, excepting that the heating unit 31' will extend from the front to the rear ends of the chamber 2, not being of sectional form. The shelf 31 is preferably supported for adjustment in the chamber 2 for which purpose, the rear corner portions of the chamber are provided with suitable brackets 32, and the front end of the chamber has side bayonet slots 33 to receive projections 34 on the opposite sides of the front end of the shelf. The shelf is placed in position by arranging the same so that its rear end is carried upon either the upper or the lower set of brackets 32, and the projections 34 are forced into corresponding upper or lower slots 33, the downward movement of the projections 34 wedging the shelf in place so as to prevent accidental outward movement thereof.

The heating unit 31' is insulated in the usual way described in reference to the other units of the heater, and the terminals of the coils of the unit 31' are connected with two pairs of spaced contacts 35 carried by the front end of the shelf 31. On the door 3 of the heater are carried stationary contact blades 36, one blade being provided for each pair of contacts 35 so that as the door closes, the blades 36 will be inserted between the contacts 35, electrically connecting said parts. The blades 36 are sufficiently elongated so that the electrical connection aforesaid will be established when the door closes, whether the shelf 31 is on the upper brackets 32 or the lower brackets 32. It is contemplated that the heating unit 31' shall be included, when operating, in the circuit of the lower heating unit $a$, see diagrammatic view, Fig. 8, wherein the heating unit 31' is noted at $c$. On the lower edge of the door 3 are the spaced contacts 37 connected by suitable wiring to the upper blade contacts 36, and their contacts 38 coacting with the contacts 37 are carried by the casing 1 to be engaged by the contacts 37 when the door 3 closes. The contacts 38 are wired to the binding posts on the contacts 22 of the bottom heating unit of the chamber 2 and thus it will be seen that the current will pass from the bottom heating unit through the heating unit 31', by means of electrical connection by the contacts 35, 36, 37 and 38, when the door is in a closed position. As the door opens, the circuit connections established by the above contacts will be broken automatically, and the heating of the shelf 31 will be temporarily discontinued until the door is again closed.

Having thus described the invention, what is claimed as new is:

1. In an electric heater, the combination of a casing, provided with a heating chamber therein, the walls thereof being in spaced relation to the walls of the casing, boxes secured to the walls of the chamber opened at their rear ends and forming compartments, heating units insertible in said compartments of the boxes from the open rear ends thereof, a door for the front end of the casing and adapted to close the front end of the heating chamber, and a removable end at the rear portion of the heater having an extension for closing the rear ends of the boxes aforesaid.

2. In an electric heater, the combination of a casing, provided with a heating chamber therein, the walls thereof being in spaced relation to the walls of the casing, boxes secured to the walls of the chamber opened at their rear ends and forming compartments, heating units insertible in said compartments of the boxes from the open rear ends thereof, a door for the front end of the casing and adapted to close the front end of the heating chamber, and a removable end at the rear portion of the heater having an extension for closing the rear ends of the boxes aforesaid, an electric circuit for supplying current to the heating units, spring contact members applied to the outer walls of the boxes at their inner extremities, and included in said circuit, and plug contacts forming terminals of the wires included in said circuit and detachably connected with the rear ends of the heating units and prevented from displacement by the extension on the rear end of the heater.

3. In a heater of the class described, the combination of an outer casing provided with a steam chamber therein, heating units adjacent to the walls of the heating chamber to supply heat thereto, an electric circuit including said heating units, a door for the heater, and a circuit closer for making and breaking the electric circuit when the door is closed and opened respectively, a shelf supported in the heating chamber, a heating unit carried thereby, electric contacts at the outer end of the shelf, electric contacts carried by the door for coöperation with those on the shelf to continue and discontinue the operation of the heating unit of the shelf as the door is closed and opened respectively, and means electrically connecting the contacts on the door with the electric circuit aforesaid.

In testimony whereof I affix my signature in presence of two witnesses.

ADAM CARPENTER.

Witnesses:
J. F. ROBB,
S. E. DODGE.